Dec. 7, 1937.  C. W. MALMQUIST  2,101,504
TOASTING APPARATUS
Filed Dec. 3, 1936  2 Sheets-Sheet 2

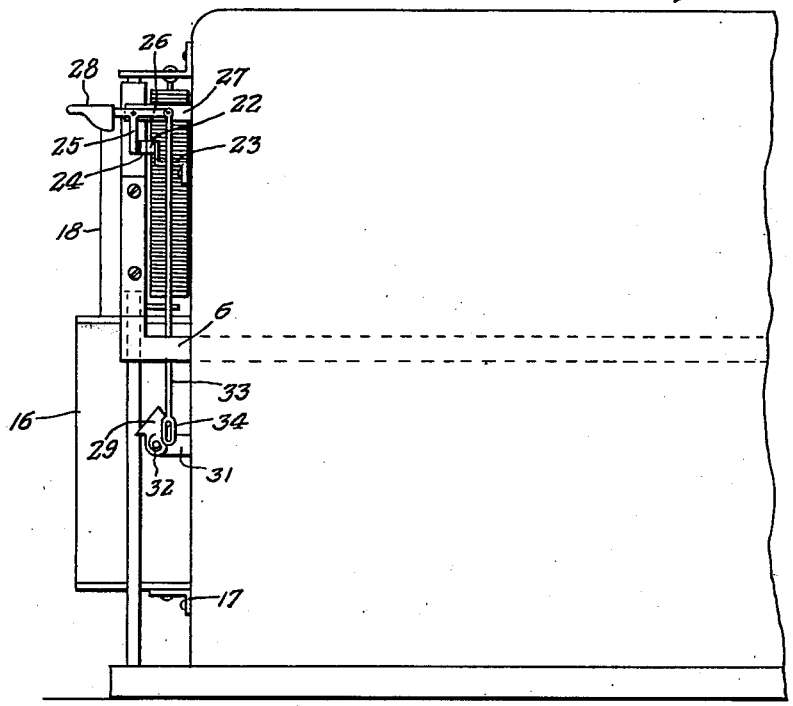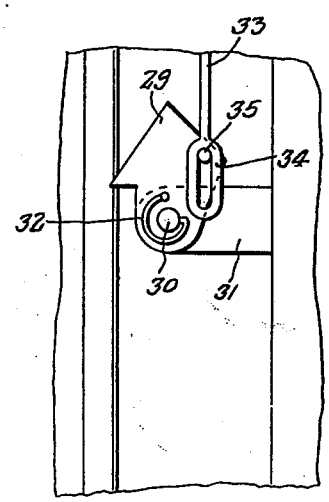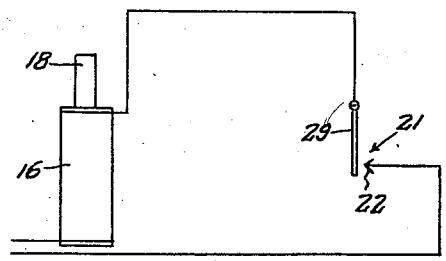

Inventor
Clayton W. Malmquist,

By Clarence A. O'Brien
Hyman Berman
Attorneys

Patented Dec. 7, 1937

2,101,504

UNITED STATES PATENT OFFICE 2,101,504

TOASTING APPARATUS

Clayton W. Malmquist, Minneapolis, Minn.

Application December 3, 1936, Serial No. 114,047

REISSUED
JAN 2 3 1940

3 Claims. (Cl. 219—19)

This invention relates to toasting apparatus and more particularly to bread toasters of the type that eject the toast when the toasting is completed.

And it is well known such types of toasters, whether electrical or mechanical, are provided with one or more racks mounted for vertical movement within the casing of the toaster for holding the bread, together with suitable mechanism connected with the racks for automatically raising the racks at the completion of the toasting operation for ejecting the toast.

The present invention is concerned with the provision of means which may be readily applied to electric toasters of the toast-ejecting type to facilitate the lowering of the bread racks and to reduce to a minimum the manual effort now required for lowering such racks.

The present invention together with its objects and advantages will be best understood from a study of the following description taken in connection with the accompanying drawings wherein:—

Figure 1 is a fragmentary side elevational view of an electric toaster and illustrating the application of the invention thereto.

Figure 4 is a fragmentary side elevational view showing a spring latch assembly forming part of the invention and Figure 5 is a wiring diagram.

Figure 2:
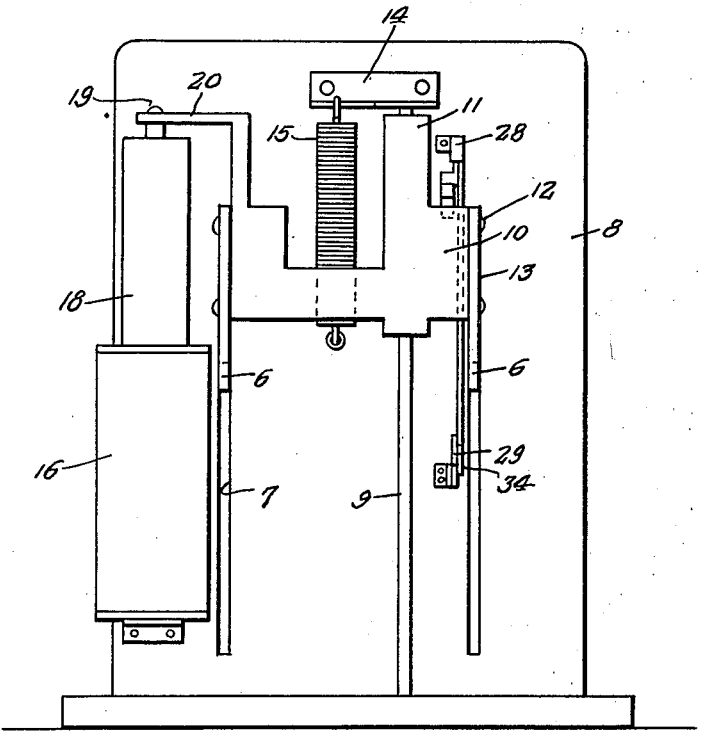
Figure 2 is an end elevational view of the toaster with the invention applied thereto and the bread racks in a raised position.
Figure 3:
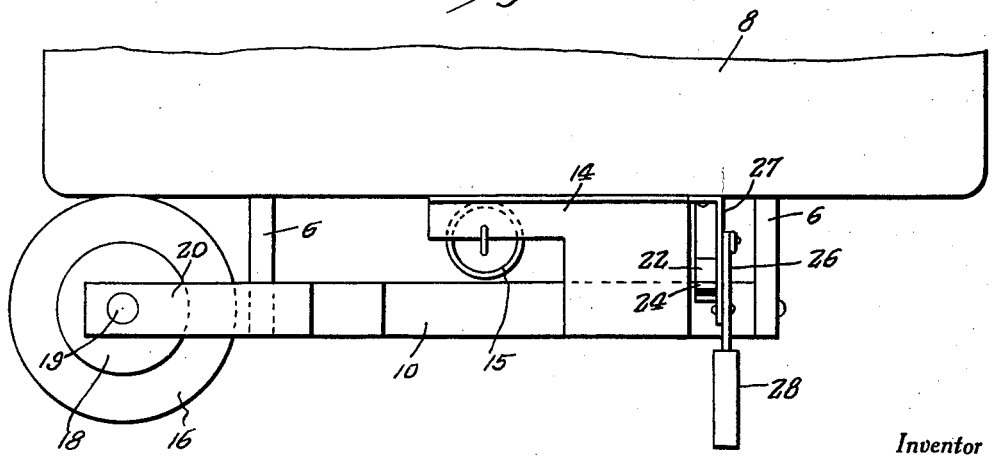
Figure 3 is a fragmentary top plan view also illustrating the invention.

Referring more in detail to the drawings it will be seen that 5 indicates a conventional electric toaster of the type that is provided, in the present instance, with two vertically shiftable bread racks or holders which latter at one end are provided with arms or extensions 6 that work through vertical slots 7 provided in an end wall of the casing 8 of the toaster.

As is well known these end extensions of the bread holders or trays are usually provided with handles and latch means mounted on the end wall of the casing of the toaster is provided to engage the ends of the bread holders or trays for releasably retaining the trays in lowered position with the bread thereon in the region of the heating element of the toaster, together with means generally provided for releasing the latch means to permit the bread holders or racks to automatically move upwardly for rejecting the toast when the toasting is completed.

In accordance with the present invention, means is provided for lowering the bread trays or racks for positioning the bread thereon in heating position and for releasably securing the racks in the lowered position.

To this end I provide a standard or guide rod 9 that rises from the base of the toaster spaced from and paralleling an end wall of the casing 8 of the toaster. A connector member 10 has a part 11 thereof having a sliding fit on the guide rod 9, and at its respective opposite ends the member 10 is bolted or otherwise secured as at 12 to upstanding terminals 13 provided on the extensions 6 of the bread racks.

Also mounted on the adjacent end of the casing 8 adjacent the top of the casing is a bracket 14 to which is secured one end of a spring 15, the opposite end of the spring being suitably connected with an intermediate portion of the member 10 for normally urging the member 10 and the bread racks upwardly to a position ejecting the bread from the toaster.

For lowering the member 10 and consequently the bread racks simultaneously there is provided a solenoid 16 that is suitably mounted as at 17 on the end wall of the casing 8. Solenoid 16 is provided with a reciprocating armature 18 one end of which is connected as at 19 to a lateral extension 20 provided at one end of the member 10 as shown in Figure 2.

The solenoid 16 as clearly shown in Figure 5 is arranged in circuit with a control switch 21.

The switch 21 comprises a fixed contact 22 mounted on a bracket 23 that is fixed to and insulated from the end wall of the toaster casing 8 as shown in Figure 1. Complemental to the contact 22 is a contact 24 mounted on and insulated from an arm 25 that depends from a lever 26. The lever 26 is pivotally mounted intermediate its ends to a bracket 27 that extends from said end of the toaster casing 8, and at one end thereof the lever 26 is provided with a suitable handle 28.

It will thus be seen that when switch 21 is closed the circuit will be completed through the solenoid 16 causing the sliding armature 18 thereof to move downwardly for lowering the member 10 and the tray racks against the action of spring 15.

For releasably retaining the member 10 and the tray racks in lowered position with the bread on the racks in heating position there is provided a latch member 29 pivoted as at 30 to a bracket arm 31 suitably mounted on the casing 8. A spring 32 acts on the latch 29 to normally urge the same into a vertical position for engaging the head thereof with the upper edge of the member 10 at the adjacent end of the latter for releasably securing the member 10 in the lowered position.

A release lever or link 33 is provided for the latch 29. At one end the lever 33 is pivoted to the member 26 while at its opposite end the rod 33 is provided with a loop 34 in which works a pin 35 provided on the latch 29.

The operation of the device is thought to be clear and may be briefly summarized as follows:

Normally the bread racks and member 10 are in the lowermost position with the latch 29 engaging the member 10 to retain the parts mentioned in this lowered position. The bread is then placed in the toaster through the usual slot provided therefor in the top of the casing 8 to rest on the bread rack. Thus the bread is supported in heating position. After the toasting operation has been completed the operator pulls upwardly on the handle 28 causing the member 26 to rotate in a clockwise direction. This will, through the medium of the loop 34 and pin 35, cause a downward pressure to be exerted on the latch 29. Latch 29, in response to such pressure, will swing in a clockwise direction against the action of spring 32 thus releasing the member 10. Spring 15 will then act on the member 10 to move the latter together with the bread racks upwardly for ejecting the toasted bread. The operator then presses downwardly on the handle 28 to swing the member 26 in a counter-clockwise direction to engage contacts 29 and 22 thus completing the circuit through the solenoid 16. Solenoid 16 will then be excited for causing the armature 18 thereof to move downwardly and this movement of the armature is transmitted to the member 10 for causing said member and the bread racks, with or without slices of bread to be toasted on the racks, to move downwardly whereupon the member 10 will re-engage with the latch 29 for releasably retaining the bread racks in this lowered position.

Thus it will be seen that with a device of this character the bread racks may be lowered simultaneously and without material effort, manually, on the part of the operator.

Having thus described the invention what is claimed as new is:—

1. In a toaster having a vertically shiftable bread rack, spring means connected with the bread rack for normally urging the same upwardly to a toast-ejecting position, latch means mounted on the toaster for releasably retaining the bread rack against the action of said spring means in a lowered position, a solenoid having a reciprocating armature connected with the bread rack for lowering the latter upon the energization of the solenoid, a switch for closing the circuit through the solenoid, and means operatively connecting the switch with said latch for releasing the latch incidental to an opening of the circuit through the solenoid.

2. In a bread toaster, a casing having bread racks mounted therein for vertical sliding movement, said casing having an end wall provided with vertical slots, and said bread racks at one end thereof being provided with extensions projecting through said slots, a fixed vertical guide rod paralleling said end wall of the casing, a member mounted on the guide rod to slide vertically relative thereto, said member having its opposite ends fixedly connected with the bread rack extensions to raise and lower the bread racks incidental to a sliding movement of said member on said guide rod, a spring anchored at one end to the end wall of said casing and having a second end secured to said member for normally urging the latter together with the bread racks to an upward position, and mechanism acting on said slide member in opposition to said spring for lowering said bread racks, said mechanism including a solenoid fixedly mounted on said casing and having a reciprocating armature connected at one end thereof with said slide member.

3. In a bread toaster, a casing having bread racks mounted therein for vertical sliding movement, said casing having an end wall provided with vertical slots, and said bread racks at one end thereof being provided with extensions projecting through said slots, a fixed vertical guide rod paralleling said end wall of the casing, a member mounted on the guide rod to slide vertically relative thereto, said member having its opposite ends fixedly connected with the bread rack extensions to raise and lower the bread racks incidental to a sliding movement of said member on said guide rod, a spring anchored at one end to the end wall of said casing and having a second end secured to said member for normally urging the latter together with the bread racks to an upward position, and mechanism acting on said slide member in opposition to said spring for lowering said bread racks, said mechanism including a solenoid fixedly mounted on said casing and having a reciprocating armature connected at one end thereof with said slide member, a latch member pivotally mounted in the path of said slide member to engage the latter when in lowered position for releasably securing said slide member and said racks in lowered position, means supporting said latch member at one end of said casing, a control switch for said solenoid mounted on said casing above said latch member, said control switch including a vertically swinging operating lever and a link connection between said lever and said latch member for operating said latch incidental to an operation of said switch.

CLAYTON W. MALMQUIST.